(12) United States Patent
Patwardhan et al.

(10) Patent No.: US 11,968,198 B2
(45) Date of Patent: *Apr. 23, 2024

(54) DISTRIBUTED AUTHENTICATION AND AUTHORIZATION FOR RAPID SCALING OF CONTAINERIZED SERVICES

(71) Applicant: Cisco Technology, Inc., San Jose, CA (US)

(72) Inventors: Sourabh Suresh Patwardhan, Milpitas, CA (US); Jalaja Padma, Fremont, CA (US); Srinivasan Krishnamurthy, San Ramon, CA (US); Rajasekhar Manam, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/147,448

(22) Filed: Dec. 28, 2022

(65) Prior Publication Data

US 2023/0231839 A1 Jul. 20, 2023

Related U.S. Application Data

(63) Continuation of application No. 16/997,483, filed on Aug. 19, 2020, now Pat. No. 11,552,937, which is a
(Continued)

(51) Int. Cl.
*G06F 21/44* (2013.01)
*G06F 9/455* (2018.01)
(Continued)

(52) U.S. Cl.
CPC .......... *H04L 63/08* (2013.01); *G06F 9/45558* (2013.01); *G06F 21/44* (2013.01);
(Continued)

(58) Field of Classification Search
CPC .......... H04L 63/08; H04L 63/10; G06F 21/44
See application file for complete search history.

(56) References Cited

U.S. PATENT DOCUMENTS

| 5,812,773 A | 9/1998 | Norin |
| 5,889,896 A | 3/1999 | Meshinsky et al. |

(Continued)

FOREIGN PATENT DOCUMENTS

| CN | 101394360 A | 3/2009 |
| CN | 101719930 A | 6/2010 |

(Continued)

OTHER PUBLICATIONS

International Search Report and Written Opinion from the International Searching Authority, dated Aug. 9, 2019, 14 pages, for corresponding International Patent Application No. PCT/US2019/037511.

(Continued)

*Primary Examiner* — David J Pearson
(74) *Attorney, Agent, or Firm* — Polsinelli P.C.

(57) ABSTRACT

The disclosed technology provides solutions for performing rapid authentication and authorization for distributed containerized microservices. In some aspects, a process of the technology can include steps for: associating a service type with a set of microservices or service pods, detecting deployment of a first microservice on a first host, and receiving an authentication and authorization state from a first virtual network edge (VNE) of the first host. In some aspects, the process can further include steps for distributing the authentication state to a second VNE on a second host, wherein the authentication state is configured to facilitate authentication of one or more subsequent microservices instantiated on the second host by the second VNE. Systems and machine readable media are also provided.

20 Claims, 4 Drawing Sheets

Related U.S. Application Data continuation of application No. 16/012,597, filed on Jun. 19, 2018, now Pat. No. 10,764,266.

(51) Int. Cl.
  *G06F 21/45* (2013.01)
  *H04L 9/40* (2022.01)

(52) U.S. Cl.
  CPC .............. *G06F 21/45* (2013.01); *H04L 63/10* (2013.01); *G06F 2009/45562* (2013.01); *G06F 2009/4557* (2013.01); *G06F 2009/45587* (2013.01); *G06F 2009/45595* (2013.01)

(56) References Cited

U.S. PATENT DOCUMENTS

| | | |
|---|---|---|
| 6,108,782 A | 8/2000 | Fletcher et al. |
| 6,178,453 B1 | 1/2001 | Mattaway et al. |
| 6,298,153 B1 | 10/2001 | Oishi |
| 6,343,290 B1 | 1/2002 | Cossins et al. |
| 6,643,260 B1 | 11/2003 | Kloth et al. |
| 6,683,873 B1 | 1/2004 | Kwok et al. |
| 6,721,804 B1 | 4/2004 | Rubin et al. |
| 6,733,449 B1 | 5/2004 | Krishnamurthy et al. |
| 6,735,631 B1 | 5/2004 | Oehrke et al. |
| 6,996,615 B1 | 2/2006 | McGuire |
| 7,054,930 B1 | 5/2006 | Cheriton |
| 7,058,706 B1 | 6/2006 | Iyer et al. |
| 7,062,571 B1 | 6/2006 | Dale et al. |
| 7,111,177 B1 | 9/2006 | Chauvel et al. |
| 7,212,490 B1 | 5/2007 | Kao et al. |
| 7,277,948 B2 | 10/2007 | Igarashi et al. |
| 7,313,667 B1 | 12/2007 | Pullela et al. |
| 7,379,846 B1 | 5/2008 | Williams et al. |
| 7,480,672 B2 | 1/2009 | Hahn et al. |
| 7,496,043 B1 | 2/2009 | Leong et al. |
| 7,536,476 B1 | 5/2009 | Alleyne |
| 7,567,504 B2 | 7/2009 | Darling et al. |
| 7,583,665 B1 | 9/2009 | Duncan et al. |
| 7,606,147 B2 | 10/2009 | Luft et al. |
| 7,644,437 B2 | 1/2010 | Volpano |
| 7,647,594 B2 | 1/2010 | Togawa |
| 7,773,510 B2 | 8/2010 | Back et al. |
| 7,808,897 B1 | 10/2010 | Mehta et al. |
| 7,881,957 B1 | 2/2011 | Cohen et al. |
| 7,917,647 B2 | 3/2011 | Cooper et al. |
| 8,010,598 B2 | 8/2011 | Tanimoto |
| 8,028,071 B1 | 9/2011 | Mahalingam et al. |
| 8,041,714 B2 | 10/2011 | Aymeloglu et al. |
| 8,121,117 B1 | 2/2012 | Amdahl et al. |
| 8,171,415 B2 | 5/2012 | Appleyard et al. |
| 8,234,377 B2 | 7/2012 | Cohn |
| 8,244,559 B2 | 8/2012 | Horvitz et al. |
| 8,250,215 B2 | 8/2012 | Stienhans et al. |
| 8,280,880 B1 | 10/2012 | Aymeloglu et al. |
| 8,284,664 B1 | 10/2012 | Aybay et al. |
| 8,301,746 B2 | 10/2012 | Head et al. |
| 8,345,692 B2 | 1/2013 | Smith |
| 8,356,171 B2 | 1/2013 | Shatzkamer et al. |
| 8,406,141 B1 | 3/2013 | Couturier et al. |
| 8,407,413 B1 | 3/2013 | Yucel et al. |
| 8,448,171 B2 | 5/2013 | Donnellan et al. |
| 8,477,610 B2 | 7/2013 | Zuo et al. |
| 8,495,356 B2 | 7/2013 | Ashok et al. |
| 8,495,725 B2 | 7/2013 | Ahn |
| 8,510,469 B2 | 8/2013 | Portolani |
| 8,514,868 B2 | 8/2013 | Hill |
| 8,532,108 B2 | 9/2013 | Li et al. |
| 8,533,687 B1 | 9/2013 | Greifeneder et al. |
| 8,547,974 B1 | 10/2013 | Guruswamy et al. |
| 8,560,639 B2 | 10/2013 | Murphy et al. |
| 8,560,663 B2 | 10/2013 | Baucke et al. |
| 8,589,543 B2 | 11/2013 | Dutta et al. |
| 8,590,050 B2 | 11/2013 | Nagpal et al. |
| 8,611,356 B2 | 12/2013 | Yu et al. |
| 8,612,625 B2 | 12/2013 | Andries et al. |
| 8,630,291 B2 | 1/2014 | Shaffer et al. |
| 8,639,787 B2 | 1/2014 | Lagergren et al. |
| 8,656,024 B2 | 2/2014 | Krishnan et al. |
| 8,660,129 B1 | 2/2014 | Brendel et al. |
| 8,719,804 B2 | 5/2014 | Jain |
| 8,775,576 B2 | 7/2014 | Hebert et al. |
| 8,797,867 B1 | 8/2014 | Chen et al. |
| 8,805,951 B1 | 8/2014 | Faibish et al. |
| 8,850,002 B1 | 9/2014 | Dickinson et al. |
| 8,850,182 B1 | 9/2014 | Fritz et al. |
| 8,856,339 B2 | 10/2014 | Mestery et al. |
| 8,909,928 B2 | 12/2014 | Ahmad et al. |
| 8,918,510 B2 | 12/2014 | Gmach et al. |
| 8,924,720 B2 | 12/2014 | Raghuram et al. |
| 8,930,747 B2 | 1/2015 | Levijarvi et al. |
| 8,938,775 B1 | 1/2015 | Roth et al. |
| 8,959,526 B2 | 2/2015 | Kansal et al. |
| 8,977,754 B2 | 3/2015 | Curry, Jr. et al. |
| 8,984,606 B2 | 3/2015 | Kamat |
| 9,009,697 B2 | 4/2015 | Breiter et al. |
| 9,015,324 B2 | 4/2015 | Jackson |
| 9,043,439 B2 | 5/2015 | Bicket et al. |
| 9,049,115 B2 | 6/2015 | Rajendran et al. |
| 9,063,789 B2 | 6/2015 | Beaty et al. |
| 9,065,727 B1 | 6/2015 | Liu et al. |
| 9,075,649 B1 | 7/2015 | Bushman et al. |
| 9,130,846 B1 | 9/2015 | Szabo et al. |
| 9,164,795 B1 | 10/2015 | Vincent |
| 9,167,050 B2 | 10/2015 | Durazzo et al. |
| 9,201,701 B2 | 12/2015 | Boldyrev et al. |
| 9,201,704 B2 | 12/2015 | Chang et al. |
| 9,203,784 B2 | 12/2015 | Chang et al. |
| 9,223,634 B2 | 12/2015 | Chang et al. |
| 9,244,776 B2 | 1/2016 | Koza et al. |
| 9,251,114 B1 | 2/2016 | Ancin et al. |
| 9,264,301 B1 | 2/2016 | Chua et al. |
| 9,264,478 B2 | 2/2016 | Hon et al. |
| 9,294,408 B1 | 3/2016 | Dickinson et al. |
| 9,313,048 B2 | 4/2016 | Chang et al. |
| 9,361,192 B2 | 6/2016 | Smith et al. |
| 9,379,982 B1 | 6/2016 | Krishna et al. |
| 9,380,075 B2 | 6/2016 | He et al. |
| 9,432,245 B1 | 8/2016 | Sorenson, III et al. |
| 9,432,294 B1 | 8/2016 | Sharma et al. |
| 9,444,744 B1 | 9/2016 | Sharma et al. |
| 9,473,365 B2 | 10/2016 | Melander et al. |
| 9,503,530 B1 | 11/2016 | Niedzielski |
| 9,558,078 B2 | 1/2017 | Farlee et al. |
| 9,571,570 B1 | 2/2017 | Mutnuru |
| 9,613,078 B2 | 4/2017 | Vermeulen et al. |
| 9,628,471 B1 | 4/2017 | Sundaram et al. |
| 9,658,876 B2 | 5/2017 | Chang et al. |
| 9,692,802 B2 | 6/2017 | Bicket et al. |
| 9,755,858 B2 | 9/2017 | Bagepalli et al. |
| 10,764,266 B2 * | 9/2020 | Patwardhan ........ H04L 63/0884 |
| 11,552,937 B2 * | 1/2023 | Patwardhan ........ H04L 63/0876 |
| 2001/0055303 A1 | 12/2001 | Horton et al. |
| 2002/0073337 A1 | 6/2002 | Ioele et al. |
| 2002/0143928 A1 | 10/2002 | Maltz et al. |
| 2002/0166117 A1 | 11/2002 | Abrams et al. |
| 2002/0174216 A1 | 11/2002 | Shorey et al. |
| 2003/0018591 A1 | 1/2003 | Komisky |
| 2003/0056001 A1 | 3/2003 | Mate et al. |
| 2003/0228585 A1 | 12/2003 | Inoko et al. |
| 2004/0004941 A1 | 1/2004 | Malan et al. |
| 2004/0034702 A1 | 2/2004 | He |
| 2004/0088542 A1 | 5/2004 | Daude et al. |
| 2004/0095237 A1 | 5/2004 | Chen et al. |
| 2004/0131059 A1 | 7/2004 | Ayyakad et al. |
| 2004/0197079 A1 | 10/2004 | Latvala et al. |
| 2004/0264481 A1 | 12/2004 | Darling et al. |
| 2005/0060418 A1 | 3/2005 | Sorokopud |
| 2005/0125424 A1 | 6/2005 | Herriott et al. |
| 2006/0062187 A1 | 3/2006 | Rune |
| 2006/0104286 A1 | 5/2006 | Cheriton |
| 2006/0126665 A1 | 6/2006 | Ward et al. |
| 2006/0146825 A1 | 7/2006 | Hofstaedter et al. |
| 2006/0155875 A1 | 7/2006 | Cheriton |

(56) References Cited

U.S. PATENT DOCUMENTS

| | | |
|---|---|---|
| 2006/0168338 A1 | 7/2006 | Bruegl et al. |
| 2006/0233106 A1 | 10/2006 | Achlioptas et al. |
| 2007/0174663 A1 | 7/2007 | Crawford et al. |
| 2007/0223487 A1 | 9/2007 | Kajekar et al. |
| 2007/0242830 A1 | 10/2007 | Conrado et al. |
| 2008/0005293 A1 | 1/2008 | Bhargava et al. |
| 2008/0080524 A1 | 4/2008 | Tsushima et al. |
| 2008/0084880 A1 | 4/2008 | Dharwadkar |
| 2008/0165778 A1 | 7/2008 | Ertemalp |
| 2008/0198752 A1 | 8/2008 | Fan et al. |
| 2008/0198858 A1 | 8/2008 | Townsley et al. |
| 2008/0201711 A1 | 8/2008 | Amir Husain |
| 2008/0235755 A1 | 9/2008 | Blaisdell et al. |
| 2009/0006527 A1 | 1/2009 | Gingell, Jr. et al. |
| 2009/0019367 A1 | 1/2009 | Cavagnari et al. |
| 2009/0031312 A1 | 1/2009 | Mausolf et al. |
| 2009/0083183 A1 | 3/2009 | Rao et al. |
| 2009/0138763 A1 | 5/2009 | Arnold |
| 2009/0177775 A1 | 7/2009 | Radia et al. |
| 2009/0178058 A1 | 7/2009 | Stillwell, III et al. |
| 2009/0182874 A1 | 7/2009 | Morford et al. |
| 2009/0265468 A1 | 10/2009 | Annambhotla et al. |
| 2009/0265753 A1 | 10/2009 | Anderson et al. |
| 2009/0293056 A1 | 11/2009 | Ferris |
| 2009/0300608 A1 | 12/2009 | Ferris et al. |
| 2009/0313562 A1 | 12/2009 | Appleyard et al. |
| 2009/0323706 A1 | 12/2009 | Germain et al. |
| 2009/0328031 A1 | 12/2009 | Pouyadou et al. |
| 2010/0036903 A1 | 2/2010 | Ahmad et al. |
| 2010/0042720 A1 | 2/2010 | Stienhans et al. |
| 2010/0061250 A1 | 3/2010 | Nugent |
| 2010/0115341 A1 | 5/2010 | Baker et al. |
| 2010/0131765 A1 | 5/2010 | Bromley et al. |
| 2010/0149966 A1 | 6/2010 | Achlioptas et al. |
| 2010/0191783 A1 | 7/2010 | Mason et al. |
| 2010/0192157 A1 | 7/2010 | Jackson |
| 2010/0205601 A1 | 8/2010 | Abbas et al. |
| 2010/0211782 A1 | 8/2010 | Auradkar et al. |
| 2010/0293270 A1 | 11/2010 | Augenstein et al. |
| 2010/0318609 A1 | 12/2010 | Lahiri et al. |
| 2010/0325199 A1 | 12/2010 | Park et al. |
| 2010/0325441 A1 | 12/2010 | Laurie et al. |
| 2010/0333116 A1 | 12/2010 | Prahlad et al. |
| 2011/0016214 A1 | 1/2011 | Jackson |
| 2011/0035754 A1 | 2/2011 | Srinivasan |
| 2011/0055396 A1 | 3/2011 | Dehaan |
| 2011/0055398 A1 | 3/2011 | Dehaan et al. |
| 2011/0055470 A1 | 3/2011 | Portolani |
| 2011/0072489 A1 | 3/2011 | Parann-Nissany |
| 2011/0075667 A1 | 3/2011 | Li et al. |
| 2011/0110382 A1 | 5/2011 | Jabr et al. |
| 2011/0116443 A1 | 5/2011 | Yu et al. |
| 2011/0126099 A1 | 5/2011 | Anderson et al. |
| 2011/0138055 A1 | 6/2011 | Daly et al. |
| 2011/0145413 A1 | 6/2011 | Dawson et al. |
| 2011/0145657 A1 | 6/2011 | Bishop et al. |
| 2011/0173303 A1 | 7/2011 | Rider |
| 2011/0185063 A1 | 7/2011 | Head et al. |
| 2011/0185065 A1 | 7/2011 | Stanisic et al. |
| 2011/0206052 A1 | 8/2011 | Tan et al. |
| 2011/0213966 A1 | 9/2011 | Fu et al. |
| 2011/0219434 A1 | 9/2011 | Betz et al. |
| 2011/0231715 A1 | 9/2011 | Kunii et al. |
| 2011/0231899 A1 | 9/2011 | Pulier et al. |
| 2011/0239039 A1 | 9/2011 | Dieffenbach et al. |
| 2011/0252327 A1 | 10/2011 | Awasthi et al. |
| 2011/0261811 A1 | 10/2011 | Battestilli et al. |
| 2011/0261828 A1 | 10/2011 | Smith |
| 2011/0276675 A1 | 11/2011 | Singh et al. |
| 2011/0276951 A1 | 11/2011 | Jain |
| 2011/0283013 A1 | 11/2011 | Grosser et al. |
| 2011/0295998 A1 | 12/2011 | Ferris et al. |
| 2011/0305149 A1 | 12/2011 | Scott et al. |
| 2011/0307531 A1 | 12/2011 | Gaponenko et al. |
| 2011/0320870 A1 | 12/2011 | Kenigsberg et al. |
| 2012/0005724 A1 | 1/2012 | Lee |
| 2012/0036234 A1 | 2/2012 | Staats et al. |
| 2012/0054367 A1 | 3/2012 | Ramakrishnan et al. |
| 2012/0072318 A1 | 3/2012 | Akiyama et al. |
| 2012/0072578 A1 | 3/2012 | Alam |
| 2012/0072581 A1 | 3/2012 | Tung et al. |
| 2012/0072985 A1 | 3/2012 | Davne et al. |
| 2012/0072992 A1 | 3/2012 | Arasaratnam et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0102193 A1 | 4/2012 | Rathore et al. |
| 2012/0102199 A1 | 4/2012 | Hopmann et al. |
| 2012/0131174 A1 | 5/2012 | Ferris et al. |
| 2012/0137215 A1 | 5/2012 | Kawara |
| 2012/0158967 A1 | 6/2012 | Sedayao et al. |
| 2012/0159097 A1 | 6/2012 | Jennas, II et al. |
| 2012/0167094 A1 | 6/2012 | Suit |
| 2012/0173710 A1 | 7/2012 | Rodriguez |
| 2012/0179909 A1 | 7/2012 | Sagi et al. |
| 2012/0180044 A1 | 7/2012 | Donnellan et al. |
| 2012/0182891 A1 | 7/2012 | Lee et al. |
| 2012/0185913 A1 | 7/2012 | Martinez et al. |
| 2012/0192016 A1 | 7/2012 | Gotesdyner et al. |
| 2012/0192075 A1 | 7/2012 | Ebtekar et al. |
| 2012/0201135 A1 | 8/2012 | Ding et al. |
| 2012/0214506 A1 | 8/2012 | Skaaksrud et al. |
| 2012/0222106 A1 | 8/2012 | Kuehl |
| 2012/0236716 A1 | 9/2012 | Anbazhagan et al. |
| 2012/0240113 A1 | 9/2012 | Hur |
| 2012/0265976 A1 | 10/2012 | Spiers et al. |
| 2012/0272025 A1 | 10/2012 | Park et al. |
| 2012/0281706 A1 | 11/2012 | Agarwal et al. |
| 2012/0281708 A1 | 11/2012 | Chauhan et al. |
| 2012/0290647 A1 | 11/2012 | Ellison et al. |
| 2012/0297238 A1 | 11/2012 | Watson et al. |
| 2012/0311106 A1 | 12/2012 | Morgan |
| 2012/0311568 A1 | 12/2012 | Jansen |
| 2012/0324092 A1 | 12/2012 | Brown et al. |
| 2012/0324114 A1 | 12/2012 | Dutta et al. |
| 2013/0003567 A1 | 1/2013 | Gallant et al. |
| 2013/0013248 A1 | 1/2013 | Brugler et al. |
| 2013/0036213 A1 | 2/2013 | Hasan et al. |
| 2013/0044636 A1 | 2/2013 | Koponen et al. |
| 2013/0066940 A1 | 3/2013 | Shao |
| 2013/0080509 A1 | 3/2013 | Wang |
| 2013/0080624 A1 | 3/2013 | Nagai et al. |
| 2013/0091557 A1 | 4/2013 | Gurrapu |
| 2013/0097601 A1 | 4/2013 | Podvratnik et al. |
| 2013/0104140 A1 | 4/2013 | Meng et al. |
| 2013/0111540 A1 | 5/2013 | Sabin |
| 2013/0117337 A1 | 5/2013 | Dunham |
| 2013/0124712 A1 | 5/2013 | Parker |
| 2013/0125124 A1 | 5/2013 | Kempf et al. |
| 2013/0138816 A1 | 5/2013 | Kuo et al. |
| 2013/0144978 A1 | 6/2013 | Jain et al. |
| 2013/0152076 A1 | 6/2013 | Patel |
| 2013/0152175 A1 | 6/2013 | Hromoko et al. |
| 2013/0159097 A1 | 6/2013 | Schory et al. |
| 2013/0159496 A1 | 6/2013 | Hamilton et al. |
| 2013/0160008 A1 | 6/2013 | Cawlfield et al. |
| 2013/0162753 A1 | 6/2013 | Hendrickson et al. |
| 2013/0169666 A1 | 7/2013 | Pacheco et al. |
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0191106 A1 | 7/2013 | Kephart et al. |
| 2013/0198374 A1 | 8/2013 | Zalmanovitch et al. |
| 2013/0201989 A1 | 8/2013 | Hu et al. |
| 2013/0204849 A1 | 8/2013 | Chacko |
| 2013/0232491 A1 | 9/2013 | Radhakrishnan et al. |
| 2013/0246588 A1 | 9/2013 | Borowicz et al. |
| 2013/0250770 A1 | 9/2013 | Zou et al. |
| 2013/0254415 A1 | 9/2013 | Fullen et al. |
| 2013/0262347 A1 | 10/2013 | Dodson |
| 2013/0283364 A1 | 10/2013 | Chang et al. |
| 2013/0297769 A1 | 11/2013 | Chang et al. |
| 2013/0318240 A1 | 11/2013 | Hebert et al. |
| 2013/0318546 A1 | 11/2013 | Kothuri et al. |

(56) References Cited

U.S. PATENT DOCUMENTS

| | | |
|---|---|---|
| 2013/0332982 A1 | 12/2013 | Rao et al. |
| 2013/0339949 A1 | 12/2013 | Spiers et al. |
| 2014/0006481 A1 | 1/2014 | Frey et al. |
| 2014/0006535 A1 | 1/2014 | Reddy |
| 2014/0006585 A1 | 1/2014 | Dunbar et al. |
| 2014/0040473 A1 | 2/2014 | Ho et al. |
| 2014/0040883 A1 | 2/2014 | Tompkins |
| 2014/0052877 A1 | 2/2014 | Mao |
| 2014/0056146 A1 | 2/2014 | Hu et al. |
| 2014/0059310 A1 | 2/2014 | Du et al. |
| 2014/0074850 A1 | 3/2014 | Noel et al. |
| 2014/0075048 A1 | 3/2014 | Yuksel et al. |
| 2014/0075108 A1 | 3/2014 | Dong et al. |
| 2014/0075357 A1 | 3/2014 | Flores et al. |
| 2014/0075501 A1 | 3/2014 | Srinivasan et al. |
| 2014/0089727 A1 | 3/2014 | Cherkasova et al. |
| 2014/0098762 A1 | 4/2014 | Ghai et al. |
| 2014/0108985 A1 | 4/2014 | Scott et al. |
| 2014/0122560 A1 | 5/2014 | Ramey et al. |
| 2014/0136779 A1 | 5/2014 | Guha et al. |
| 2014/0140211 A1 | 5/2014 | Chandrasekaran et al. |
| 2014/0141720 A1 | 5/2014 | Princen et al. |
| 2014/0156557 A1 | 6/2014 | Zeng et al. |
| 2014/0164486 A1 | 6/2014 | Ravichandran et al. |
| 2014/0188825 A1 | 7/2014 | Muthukkaruppan et al. |
| 2014/0189095 A1 | 7/2014 | Lindberg et al. |
| 2014/0189125 A1 | 7/2014 | Amies et al. |
| 2014/0215471 A1 | 7/2014 | Cherkasova et al. |
| 2014/0222953 A1 | 8/2014 | Karve et al. |
| 2014/0230044 A1 | 8/2014 | Liu et al. |
| 2014/0244851 A1 | 8/2014 | Lee |
| 2014/0245298 A1 | 8/2014 | Zhou et al. |
| 2014/0281173 A1 | 9/2014 | Im et al. |
| 2014/0282536 A1 | 9/2014 | Dave et al. |
| 2014/0282611 A1 | 9/2014 | Campbell et al. |
| 2014/0282889 A1 | 9/2014 | Ishaya et al. |
| 2014/0289200 A1 | 9/2014 | Kato |
| 2014/0295831 A1 | 10/2014 | Karra et al. |
| 2014/0297569 A1 | 10/2014 | Clark et al. |
| 2014/0297835 A1 | 10/2014 | Buys |
| 2014/0310391 A1 | 10/2014 | Sorenson, III et al. |
| 2014/0310417 A1 | 10/2014 | Sorenson, III et al. |
| 2014/0310418 A1 | 10/2014 | Sorenson, III et al. |
| 2014/0314078 A1 | 10/2014 | Jilani |
| 2014/0317261 A1 | 10/2014 | Shatzkamer et al. |
| 2014/0321278 A1 | 10/2014 | Cafarelli et al. |
| 2014/0330976 A1 | 11/2014 | Van Bemmel |
| 2014/0330977 A1 | 11/2014 | Van Bemmel |
| 2014/0334488 A1 | 11/2014 | Guichard et al. |
| 2014/0362682 A1 | 12/2014 | Guichard et al. |
| 2014/0365680 A1 | 12/2014 | Van Bemmel |
| 2014/0366155 A1 | 12/2014 | Chang et al. |
| 2014/0369204 A1 | 12/2014 | Anand et al. |
| 2014/0372567 A1 | 12/2014 | Ganesh et al. |
| 2014/0379938 A1 | 12/2014 | Bosch et al. |
| 2015/0033086 A1 | 1/2015 | Sasturkar et al. |
| 2015/0043576 A1 | 2/2015 | Dixon et al. |
| 2015/0052247 A1 | 2/2015 | Threefoot et al. |
| 2015/0052517 A1 | 2/2015 | Raghu et al. |
| 2015/0058382 A1 | 2/2015 | St. Laurent et al. |
| 2015/0058459 A1 | 2/2015 | Amendjian et al. |
| 2015/0071285 A1 | 3/2015 | Kumar et al. |
| 2015/0085870 A1 | 3/2015 | Narasimha et al. |
| 2015/0089082 A1 | 3/2015 | Patwardhan et al. |
| 2015/0100471 A1 | 4/2015 | Curry, Jr. et al. |
| 2015/0103827 A1 | 4/2015 | Quinn et al. |
| 2015/0106802 A1 | 4/2015 | Ivanov et al. |
| 2015/0106805 A1 | 4/2015 | Melander et al. |
| 2015/0117199 A1 | 4/2015 | Chinnaiah Sankaran et al. |
| 2015/0117458 A1 | 4/2015 | Gurkan et al. |
| 2015/0120914 A1 | 4/2015 | Wada et al. |
| 2015/0124622 A1 | 5/2015 | Kovvali et al. |
| 2015/0138973 A1 | 5/2015 | Kumar et al. |
| 2015/0178133 A1 | 6/2015 | Phelan et al. |
| 2015/0188769 A1 | 7/2015 | Gu |
| 2015/0189009 A1 | 7/2015 | Van Bemmel |
| 2015/0215819 A1 | 7/2015 | Bosch et al. |
| 2015/0227405 A1 | 8/2015 | Jan et al. |
| 2015/0242204 A1 | 8/2015 | Hassine et al. |
| 2015/0249709 A1 | 9/2015 | Teng et al. |
| 2015/0263901 A1 | 9/2015 | Kumar et al. |
| 2015/0280980 A1 | 10/2015 | Bitar |
| 2015/0281067 A1 | 10/2015 | Wu |
| 2015/0281113 A1 | 10/2015 | Siciliano et al. |
| 2015/0309908 A1 | 10/2015 | Pearson et al. |
| 2015/0319063 A1 | 11/2015 | Zourzouvillys |
| 2015/0326524 A1 | 11/2015 | Tankala et al. |
| 2015/0339210 A1 | 11/2015 | Kopp et al. |
| 2015/0358850 A1 | 12/2015 | La Roche, Jr. et al. |
| 2015/0365324 A1 | 12/2015 | Kumar et al. |
| 2015/0373108 A1 | 12/2015 | Fleming et al. |
| 2016/0011925 A1 | 1/2016 | Kulkarni et al. |
| 2016/0013990 A1 | 1/2016 | Kulkarni et al. |
| 2016/0026684 A1 | 1/2016 | Mukherjee et al. |
| 2016/0062786 A1 | 3/2016 | Meng et al. |
| 2016/0094389 A1 | 3/2016 | Jain et al. |
| 2016/0094398 A1 | 3/2016 | Choudhury et al. |
| 2016/0094453 A1 | 3/2016 | Jain et al. |
| 2016/0094454 A1 | 3/2016 | Jain et al. |
| 2016/0094455 A1 | 3/2016 | Jain et al. |
| 2016/0094456 A1 | 3/2016 | Jain et al. |
| 2016/0094480 A1 | 3/2016 | Kulkarni et al. |
| 2016/0094643 A1 | 3/2016 | Jain et al. |
| 2016/0099847 A1 | 4/2016 | Melander et al. |
| 2016/0099853 A1 | 4/2016 | Nedeltchev et al. |
| 2016/0099864 A1 | 4/2016 | Akiya et al. |
| 2016/0105393 A1 | 4/2016 | Thakkar et al. |
| 2016/0124742 A1 | 5/2016 | Rangasamy et al. |
| 2016/0127184 A1 | 5/2016 | Bursell |
| 2016/0134557 A1 | 5/2016 | Steinder et al. |
| 2016/0156708 A1 | 6/2016 | Jalan et al. |
| 2016/0164780 A1 | 6/2016 | Timmons et al. |
| 2016/0164914 A1 | 6/2016 | Madhav et al. |
| 2016/0182378 A1 | 6/2016 | Basavaraja et al. |
| 2016/0188527 A1 | 6/2016 | Cherian et al. |
| 2016/0234071 A1 | 8/2016 | Nambiar et al. |
| 2016/0239399 A1 | 8/2016 | Babu et al. |
| 2016/0253078 A1 | 9/2016 | Ebtekar et al. |
| 2016/0254968 A1 | 9/2016 | Ebtekar et al. |
| 2016/0261564 A1 | 9/2016 | Foxhoven et al. |
| 2016/0277368 A1 | 9/2016 | Narayanaswamy et al. |
| 2017/0005948 A1 | 1/2017 | Melander et al. |
| 2017/0024260 A1 | 1/2017 | Chandrasekaran et al. |
| 2017/0026294 A1 | 1/2017 | Basavaraja et al. |
| 2017/0026470 A1 | 1/2017 | Bhargava et al. |
| 2017/0041342 A1 | 2/2017 | Efremov et al. |
| 2017/0054659 A1 | 2/2017 | Ergin et al. |
| 2017/0097841 A1 | 4/2017 | Chang et al. |
| 2017/0099188 A1 | 4/2017 | Chang et al. |
| 2017/0104755 A1 | 4/2017 | Arregoces et al. |
| 2017/0147297 A1 | 5/2017 | Krishnamurthy et al. |
| 2017/0149878 A1 | 5/2017 | Mutnuru |
| 2017/0163531 A1 | 6/2017 | Kumar et al. |
| 2017/0171158 A1 | 6/2017 | Hoy et al. |
| 2017/0230349 A1 | 8/2017 | Gaur et al. |
| 2017/0264663 A1 | 9/2017 | Bicket et al. |
| 2017/0339070 A1 | 11/2017 | Chang et al. |
| 2017/0359217 A1 | 12/2017 | Ahuja et al. |
| 2018/0157512 A1 | 6/2018 | Savov et al. |
| 2019/0065278 A1 | 2/2019 | Jeuk et al. |

FOREIGN PATENT DOCUMENTS

| | | |
|---|---|---|
| CN | 101394360 B | 7/2011 |
| CN | 102164091 A | 8/2011 |
| CN | 104320342 A | 1/2015 |
| CN | 105740084 A | 7/2016 |
| EP | 2228719 A1 | 9/2010 |
| EP | 2439637 A1 | 4/2012 |
| EP | 2645253 A1 | 10/2013 |
| EP | 2645253 B1 | 11/2014 |
| KR | 20150070676 A | 6/2015 |
| TW | M394537 U | 12/2010 |

(56) References Cited

FOREIGN PATENT DOCUMENTS

| | | | |
|---|---|---|---|
| WO | 2009155574 | A1 | 12/2009 |
| WO | 2010030915 | A2 | 3/2010 |
| WO | 2013158707 | A1 | 10/2013 |

OTHER PUBLICATIONS

Wan, Xili, et al., "Application deployment using Microservice and Docker containers: Framework and optimization," Journal of Network and Computer Applications 119 (2018) 97-109 (Year: 2018), 13 pages.
Dawood, Sultan, "Cisco ACI and Kubernetes: Increased Automation and Security for Cloud Native Applications," Jun. 10, 2018, 9 pages.
Wikipedia, "IEEE 802.1X," Oct. 23, 2016, 8 pages.
Wikipedia, "Kubernetes," Jun. 7, 2014, 8 pages.
Mu S., et al., "µLibCloud: Providing High Available and Uniform Accessing to Multiple Cloud Storages", IEEE 13th International Conference on Grid Computing 2012, pp. 201-208.
Naik V.K., et al., "Harmony: A Desktop Grid for Delivering Enterprise Computations," Grid Computing, Fourth International Workshop on Proceedings, Nov. 17, 2003, pp. 1-11.
Nair S.K., et al., "Towards Secure Cloud Bursting, Brokerage and Aggregation," 2012, Retrieved from URL: www.flexiant.com, 8 Pages.
Nielsen, "SimMetry Audience Measurement Technology," [Accessed on Jul. 22, 2015] Retrieved from URL: http://www.nielsen-admosphere.eu/products-and-services/simmetry-audience-measurement-technology/, 6 Pages.
Nielsen, "Television," 4 pages, [Retrieved on Jul. 22, 2015], Retrived from URL: http://www.nielsen.com/us/en/solutions/measurement/television.html.
Open Stac: "Filter Scheduler", Updated Dec. 17, 2017, [Retrieved on Dec. 18, 2017], 5 pages.
Quinn P., et al., "Service Function Chaining (SFC) Architecture: draft-quinn-sfc-arch-03.txt," Network Working Group, Internet-Draft, Jan. 22, 2014, 21 Pages.
Quinn P., et al., "Network Service Header: draft-quinn-sfc-nsh-03.txt," Internet Engineering Task Force Draft, Jul. 3, 2014, 27 Pages.
Rabadan J., et al., "Operational Aspects of Proxy-ARP/ND in EVPN Networks," BESS Worksgroup Internet Draft, Oct. 6, 2015, Retrieved from URL: draft-snr-bess-evpn-proxy-arp-nd-02, 22 Pages.
Saidi Ali G., et al., "Performance Validation of Network-Intensive Workloads on a Full-System Simulator," Interaction between Operating System and Computer Architecture Workshop, (IOSCA2005), Austin, Texas, Oct. 2005, 10 pages.
Shunra, "Shunra for HP Software, Enabling Confidence in Application Performance Before Deployment," 2010, 2 pages.
Son J., "Automated Decision System for Efficient Resource Selection and Allocation in Inter-Clouds," Jun. 2013, 35 Pages.
Sun A., et al., "IaaS Public Cloud Computing Platform Scheduling Model and Optimization Analysis," International Journal Communications, Network and System Sciences, Apr. 2011, pp. 803-811.
Szymaniak M., et al., "Latency-Driven Replica Placement," IPSJ Journal, vol. 47, No. 8, Aug. 2006, 12 pages.
Toews E., "Introduction to Apache Jclouds," Apr. 7, 2014, 23 pages.
Wikipedia, "Filter (software)," Wikipedia, [Retrieved on Feb. 8, 2014], 2 pages.
Wikipedia, "Pipeline (Unix)," [Retrieved on May 4, 2014], 4 pages.
Ye X., et al., "A Novel Blocks Placement Strategy for Hadoop," IEEE/ACTS 11th International Conference on Computerand Information Science, IEEE, 2012, 5 pages.
Amedro B., et al., "An Efficient Framework for Running Applications on Clusters, Grids and Clouds," 2010, 17 pages.
Anonymous, "Kubernetes—Wikipedia," From Wikipedia, Jan. 28, 2018, pp. 1-8, XP055486775, [Retrieved on Jun. 21, 2018] Retrieved from URL: https://en.wikipedia.org/w/index.php?title=Kubernetes&oldid=822862688.

Author Unknown, "5 Benefits of a Storage Gateway in the Cloud," Blog, TwinStrata, Inc., Jul. 25, 2012, XP055141645, 4 pages.
Author Unknown, "A Look at DeltaCloud: The Multi-Cloud API," Feb. 17, 2012, 4 pages.
Author Unknown, "About Deltacloud," Apache Software Foundation, Aug. 18, 2013, 1 page.
Author Unknown, "Apache Ambari Meetup What's New," Hortonworks Inc., Sep. 2013, 28 pages.
Author Unknown, "Architecture for Managing Clouds, A White Paper from the Open Cloud Standards Incubator," Version 1.0.0, Document No. DSP-IS0102, Jun. 18, 2010, 57 pages.
Author Unknown, "Cloud Infrastructure Management Interface (CIMI) Primer," Document No. DSP2027, Version 1.0.1, Sep. 12, 2012, 30 pages.
Author Unknown, "Cloud Infrastructure Management Interface-Common Information Model (CIMI-CIM)," Document No. DSP0264, Version 1.0.0, Dec. 14, 2012, 21 pages.
Author Unknown, "CloudControl Documentation," Aug. 25, 2013, 14 pages.
Author Unknown, "Interoperable Clouds, A White Paper from the Open Cloud Standards Incubator," Version 1.0.0, Document No. DSP-IS0101, Nov. 11, 2009, 21 pages.
Author Unknown, Introduction, Apache Ambari project, Apache Software Foundation, 2014, 1 page.
Author Unknown, "Joint Cisco and VMWare Solution for Optimizing Virtual Desktop Delivery: Data Center 3.0: Solutions to Accelerate Data Center Virtualization," Cisco Systems Incorporated, VMware Incorporated, Sep. 2008, 10 Pages.
Author Unknown, "Microsoft Cloud Edge Gateway (MCE) Series Appliance," Iron Networks, Inc., 2014, 4 pages.
Author Unknown, "Real-Time Performance Monitoring on Juniper Networks Devices: Tips and Tools for Assessing and Analyzing Network Efficiency," Juniper Networks Incorporated, May 2010, 35 Pages.
Author Unknown, "Use Cases and Interactions for Managing Clouds, A White Paper from the Open Cloud Standards Incubator," Version 1.0.0, Document No. DSP-ISO0103, Jun. 16, 2010, 75 pages.
Baker F., "Requirements for IP Version 4 Routers," Network Working Group, Cisco Systems, Jun. 1995, 175 Pages.
Beyer S., "Module 'Data:Locations'," YAPC::Europe, London, United Kingdom, ICA, Sep. 22-24, 2000, XP002742700, 15 Pages.
Blanchet M., "A Flexible Method for Managing the Assignment of Bits of an IPV6 Address Block," Network Working Group, Viagenie, Apr. 2003, 8 Pages.
Borovick L, et al., "Architecting the Network for the Cloud," IDC White Paper, Jan. 2011,8 pages.
Bosch G., etal., "Virtualization," Lehigh University, 2012, 33 pages.
Broadcasters Audience Research Board, "What's Next," [Retrieved on Jul. 22, 2015], 2 pages, Retrieved from URL: http://www.barb.co.uk/whats-next.
Cisco Systems Inc., "Best Practices in Deploying Cisco Nexus 1000V Series Switches on Cisco UCS B and C Series Cisco UCS Manager Servers," Cisco White Paper, Apr. 2011, Retrieved from URL: http://www.cisco.com/en/US/prod/collateral/switches/ps9441/ps9902/whitepaperc11-558242.pdf, 36 Pages.
Cisco Systems, Inc., "Cisco Intercloud Fabric: Hybrid Cloud with Choice, Consistency, Control and Compliance," Dec. 10, 2014, 22 pages.
Cisco Systems Inc., "Cisco Unified Network Services: Overcome Obstacles to Cloud-Ready Deployments," Cisco White Paper, Jan. 2011,6 Pages.
Cisco Technology, Inc., "Cisco Expands Videoscape TV Platform Into the Cloud," Jan. 6, 2014, Las Vegas, Nevada, Press Release, 3 pages.
Citrix, "Citrix StoreFront 2.0," White Paper, Proof of Concept Implementation Guide, Citrix Systems, Inc., 2013, 48 pages.
Citrix, "CloudBridge for Microsoft Azure Deployment Guide," May 22, 2013, 30 pages.
Citrix, "Deployment Practices and Guidelines for NetScaler 10.5 on Amazon Web Services," White Paper, citrix.com, 2014, 14 pages.
Clarke A., et al., "Open Data Center Alliance Usage: Virtual Machine (VM) Interoperability in a Hybrid Cloud Environment Rev. 1.2," Open Data Center Alliance, 2013, pp. 1-18.

(56) References Cited

OTHER PUBLICATIONS

CSS Corp, "Enterprise Cloud Gateway (ECG) Policy driven framework for managing multi-cloud environments," original published on or about Feb. 11, 2012, 1 page, Retrieved from URL: http://www.css-cloud.com/platform/enterprise-cloud-gateway, php.

Fang K "LISP MAC-EID-TO-RLOC Mapping (LISP based L2VPN)," Network Working Group, Internet Draft, CISCO Systems, Jan. 2012, 12 pages.

Ford B., et al., "Peer-to-Peer Communication Across Network Address Translators," In Usenix Annual Technical Conference, 2005, 14 Pages.

Gedymin A., "Cloud Computing with an Emphasis on Google App Engine," Sep. 2011, 146 pages.

Good N.A., "Use Apache Deltacloud to Administer Multiple Instances with a Single API," Dec. 17, 2012, 7 pages.

Herry W., "Keep It Simple, Stupid: OpenStack Nova-Scheduler and its Algorithm," IBM, May 12, 2012, 18 Pages.

Hewlett-Packard Company, "Virtual Context Management on Network Devices," Research Disclosure, vol. 564, No. 60, Apr. 1, 2011, Mason Publications, Hampshire, GB, 524, 1 page.

International Preliminary Report on Patentability for International Application No. PCT/US2019/037511, dated Dec. 30, 2020, 10 Pages.

Juniper Networks, Inc., "Recreating Real Application Traffice in Junosphere Lab," Solution Brief, Dec. 2011, 3 pages.

Kenhui, "Musings On Cloud Computing and IT-as-a-Service: [Updated for Havana] Openstack Computer for VSphere Admins, Part 2: Nova-Scheduler and DRS," Cloud Architect Musings, Jun. 26, 2013, 12 Pages.

Kolyshkin K., "Virtualization in Linux," Sep. 1, 2006, 5 pages, XP055141648, Retrieved from URL: https://web.archive.org/web/20070120205111/ http://download.openvz.orq/doc/openvz-intro.pdf.

Kumar S., et al., "Infrastructure Service Forwarding for NSH," Service Function Chaining Internet Draft, draft-kumar-sfc-nsh-forwarding-00, Feb. 15, 2016, 17 pages.

Kunz T., et al., "OmniCloud—The Secure and Flexible Use of Cloud Storage Services," Whitepaper, 2014, 30 pages.

Laszewski G.V., et al., "Design of a Dynamic Provisioning System for a Federated Cloud and Bare-metal Environment," 2012, 8 pages.

Lerach S.R.O., "Golem," [Accessed on Jul. 22, 2015] Retrieved from URL: http://www.lerach.cz/en/products/golem, 2 Pages.

Linthicum D., "VM Import Could be a Game Changer for Hybrid Clouds," InfoWorld, Dec. 23, 2010, 4 pages.

Logan M., "Hybrid Cloud Application Architecture for Elastic Java-Based Web Applications," F5 Deployment Guide Version 1.1, 2016, 65 pages.

Lynch S., "Monitoring cache with Claspin," Facebook Engineering, Sep. 19, 2012, 5 pages.

Meireles F.M.D., "Integrated Management of Cloud Computing Resources," 2013-2014, 286 pages.

Meraki, "Meraki Releases Industry's First Cloud-managed Routers," Jan. 13, 2011, 2 Pages.

\* cited by examiner

DISTRIBUTED AUTHENTICATION AND AUTHORIZATION FOR RAPID SCALING OF CONTAINERIZED SERVICES

CROSS-REFERENCE TO RELATED APPLICATION

This application in a Continuation of U.S. Non-Provisional patent application Ser. No. 16/997,483, filed on Aug. 19, 2020, which in turn, is a Continuation of U.S. Non-Provisional patent application Ser. No. 16/012,597, filed Jun. 19, 2018, now U.S. Pat. No. 10,764,266, the contents of which are incorporated herein by reference in their entirety.

BACKGROUND

1. Technical Field

This disclosure relates in general to the field of computer networks and, more particularly, pertains to the distributed authentication and authorization of containerized microservices.

2. Introduction

Containerized microservices are becoming the preferred method of deploying complex enterprise applications. Rather than build a single monolithic application, container based microservices split the application into multiple smaller interconnected components.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
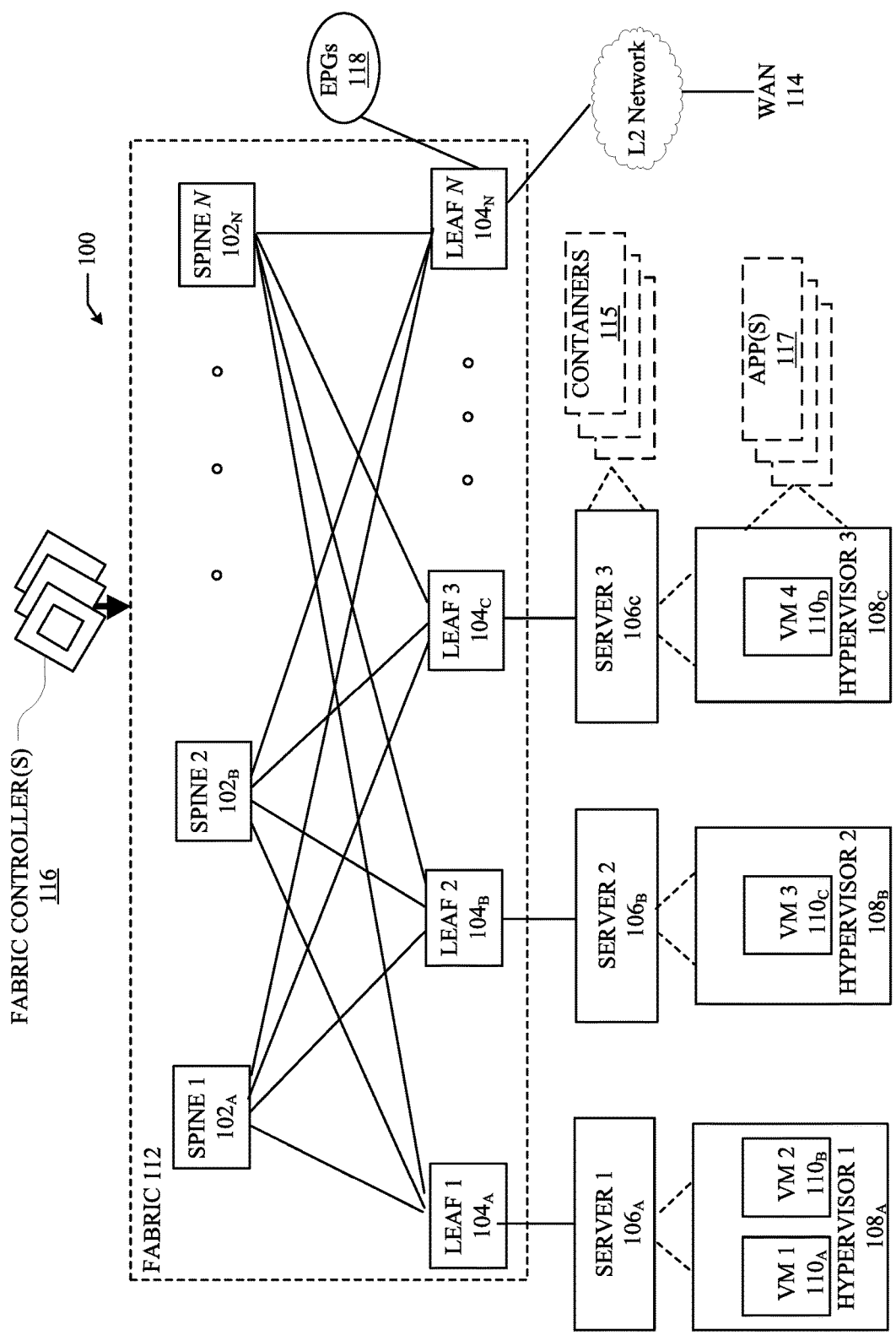
FIG. 1 illustrates an example network environment in which some aspects of the technology can be implemented.

The detailed description set forth below is intended as a description of various configurations of the disclosed technology and is not intended to represent the only configurations in which the technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview:

Disclosed are systems, methods, and computer-readable storage media for distributing the authentication process for containerized microservices, for example, to facilitate rapid horizontal scaling. In some aspects, a fabric controller distributes an authentication and authorization state for a particular set of microservices (pods) associated with a particular service type. The controller can associate a service type with a set of microservice pods. The controller can then detect deployment of a first microservice on a first host, wherein the first microservice is associated with the first service type. Next, the fabric controller can receive an authentication state from a first virtual network edge (VNE) of the first host, and can then distribute the authentication state to a second virtual network edge (VNE) on a second host. In some aspects, the authentication state can be configured to facilitate authentication of one or more subsequent microservices instantiated on the second host by the second VNE.

In some aspects, the authentication state is configured to cause the second VNE to permit authentication if the one or more subsequent microservices are associated with the first service type; alternatively, the authentication state can be configured to cause the second VNE to perform authentication if the one or more subsequent microservices are not associated with the first service type. In some aspects, a process of the technology can further include steps for distributing the association between the first service type and the set of microservice pods to a plurality of VNE devices. In some implementations, detecting deployment of the first microservice can further include: receiving a pod deployment notification from a Kubernetes cluster. Additionally, in some aspects the authentication state received from the first VNE can include one or more authorization policies, and wherein the authentication state received from the first VNE comprises an authentication and authorization result of an 802.1X workflow.

Description:

In a conventional microservice authentication and authorization process, each new microservice (e.g., pod/replica) is separately authenticated by an authentication server, for example, using the 802.1X workflow. Due to authentication resource bottlenecks, this process makes it difficult to rapidly scale microservices to new host devices (which require additional authorizations). As such, there exists a need to alleviate authentication server loads while also providing solutions for enabling fast-scaling capabilities for newly deployed microservices.

Aspects of the disclosed technology address the foregoing need by providing systems and processes for distributing authentication/authorization capabilities to the network edge devices, i.e., pod hosts.

In some implementations, microservice authentication is initially performed by the authentication server for newly instantiated services. The authentication result (i.e., authorized/unauthorized) is then distributed to each edge device (VNE on a pod host) in the container cluster (e.g., a Kubernetes cluster). Depending on implementation, distribution of the authentication result can be coordinated by a separate device, such as a fabric controller, e.g., an ACI Application Policy Infrastructure Controller (APIC), or using a distributed data store, or the like.

In some aspects, subsequent/additional authorizations for previously deployed containers, container clusters (pods), or particular services may be performed upon the occurrence of particular event. For example, re-authentications for a particular microservice or set of microservices may be requested by a POD or VNE. After subsequent authorizations are completed by a corresponding VNE, Extensible Authentication Protocol (EAP) messages indicating authorization "success" or "fail" sates can be forwarded to the microservice(s). If the re-authorization results in a state change for the service, the update can be propagated to the other VNEs, e.g., via the fabric controller.

Additionally, in some implementations, it is possible to explicitly enable or disable specific sets of microservices. For example, in implementations where a microservice manager is used, such as Kubernetes, the enable/disable intent may be communicated using labels and enforced at the fabric controller.

By caching and distributing authentication results across various devices, horizontal scaling of microservices can be improved e.g., by reducing the time for a pod to begin providing service. Because aspects of the disclosed technology also enable VNE devices to perform pod authentication/authorization, pod authentication is distributed, thereby alleviating authentication server loads and adding authentication capability redundancy, for example, if authentication servers are taken offline.

Additional details describing example systems and processes for implementing a distributed microservice authentication solution are provided below. The disclosure now turns to an overview of computer networking, followed by the description of an example environment illustrated in FIG. 1, which provides example network environment 100 in which some aspects of the technology can be implemented.

Network 100 includes a Fabric 112 that represents a physical layer or infrastructure (underlay) of network 100. Fabric 112 includes Spines 102 (e.g., spine routers or switches) and Leafs 104 (e.g., leaf routers or switches) that are interconnected for switching/routing traffic in Fabric 112. Spines 102 interconnect Leafs 104 in Fabric 112, and Leafs 104 connect Fabric 112 to the overlay portion of network 100, which includes application services (APPs 117), servers 106, virtual machines (VMs) 110, containers 115, endpoints, endpoint groups (EPGs) 118, etc. Thus, network connectivity in Fabric 112 can flow from Spines 102 to Leafs 104, and vice versa. Leafs 104 can be, for example, top-of-rack ("ToR") switches, aggregation switches, gateways, ingress and/or egress switches, provider edge devices, and/or any other type of routing or switching device/s.

Leafs 104 can be responsible for routing and/or switching tenant or customer packets and applying network policies. Network policies, such as authentication policies, can be driven by the one or more controllers 116 and/or the Leafs 104. Leafs 104 can connect Servers 106, Hypervisors 108, Virtual Machines (VMs) 110, Containers 115, Applications 116, Endpoints 118, External Routers 114, etc., with Fabric 112. For example, Leafs 104 can encapsulate and decapsulate packets to and from Servers 106 in order to enable communications throughout network 100, including Fabric 112. Leafs 104 can also provide any other devices, services, tenants, or workloads with access to Fabric 112.

VMs 110 can be virtual machines hosted by Hypervisors 108 running on Servers 106. VMs 110 can include workloads running on a guest operating system on a respective server. Hypervisors 108 can provide a layer of software, firmware, and/or hardware that creates and runs the VMs 110. Hypervisors 108 can allow VMs 110 to share hardware resources on Servers 106, and the hardware resources on Servers 106 to appear as multiple, separate hardware platforms. Moreover, Hypervisors 108 on Servers 106 can each host one or more VMs 110. Servers 106 and/or VMs 110 can be configured to various applications, that perform network functionality, such as, by virtualizing various routing, filtering and security functions. Network applications can include software applications, services, operators, containers, container clusters (e.g., one or more pods) appliances, functions, service chains, etc. For example, Applications 116 can include a firewall, a database, a CDN server, an IDS/IPS, a deep packet inspection service, a message router, a virtual switch, etc.

In some cases, VMs 110 and/or Hypervisors 108 can be migrated to other Servers 106. Servers 106 can similarly be migrated to other locations in the network environment 100. For example, a server connected to a specific leaf can be changed to connect to a different or additional leaf. Such configuration or deployment changes can involve modifications to settings and policies that are applied to the resources being migrated.

In some cases, one or more Servers 106, Hypervisors 108, and/or VMs 110 can represent a tenant or customer space. Tenant space can include workloads, services, applications, devices, and/or resources that are associated with one or more clients or subscribers. Accordingly, traffic in network environment 100 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants. Addressing, policy, and configuration information between tenants can be managed by one or more controllers 116.

Policies, configurations, settings, etc., in the network can be implemented at the application level, the physical level, and/or both. For example, one or more controllers 116 can define a policy model at the application level which defines policies and other settings for groups of applications or services, such as endpoint groups. In some addition, the Leafs 104, as well as other physical devices such as physical servers or Spines 102, can apply specific policies to traffic. For example, Leafs 104 can apply specific policies or contracts to traffic based on tags or characteristics of the traffic, such as protocols associated with the traffic, applications or endpoint groups associated with the traffic, network address information associated with the traffic, etc.

By way of example, a fabric controller may be implemented using ACI, which can provide an application policy-based solution through scalable distributed enforcement, and support integration of physical and virtual environments under a declarative policy model for networks, servers, services, security, requirements, etc. For example, the ACI framework implements End Point Groups (EPGs), which can include a collection of endpoints or applications that share common policy requirements, such as security, QoS, services, etc. Endpoints can be virtual/logical or physical devices, such as VMs and bare-metal physical servers that are connected to network 100.

Endpoints can have one or more attributes such as VM name, guest OS name, a security tag, etc. Application policies can be applied between EPGs, instead of endpoints directly, for example, in the form of contracts. Leafs 104 can classify incoming traffic into different EPGs. The classification can be based on, for example, a network segment identifier such as a Virtual LAN (VLAN) ID, a Virtual Extensible LAN (VXLAN) Network Identifier (VNID), Network Virtualization using Generic Routing Encapsulation (NVGRE) Virtual Subnet Identifier (VSID), MAC address, IP address, etc.

In some cases, classification in the ACI infrastructure can be implemented by Application Virtual Switches (AVS), which can run on a host, and physical hosts. For example, an AVS can classify traffic based on specified attributes, and tag packets of different attribute EPGs with different identifiers, such as network segment identifiers (e.g., VLAN ID). Finally, Leafs 104 can tie packets with their attribute EPGs based on their identifiers and enforce policies, which can be implemented and/or managed by one or more controllers 116, such as an application policy infrastructure controller (APIC). The Leaf 104 can classify to which EPG the traffic from a host belong and enforce policies accordingly.

Network 100 may deploy different hosts via the Leafs 104, Servers 106, Hypervisors 108, VMs 110, and other applications or processes such as containers, controllers, and/or endpoints. By way of example, hosts may be implemented as VMware ESXi hosts, Windows Hyper-V hosts, bare metal physical hosts, etc. Network 100 can interoperate with a wide variety of Hypervisors 108, Servers 106 (e.g., physical and/or virtual servers), SDN orchestration platforms, etc. Network 100 may implement a declarative model to allow its integration with application design and holistic network policy.

Network 100 can include one or more different types of SDN solutions, hosts, etc. For the sake of clarity and explanation purposes, the examples in the following disclosure will be described in the context of an ACI solution implemented in the network 100, and the one or more controllers 116 may be interchangeably referenced as APIC controllers. However, it should be noted that the technologies and concepts herein are not limited to ACI architectures and may be implemented in other architectures and configurations, including other SDN solutions as well as other types of networks which may not deploy an SDN solution.

Further, as referenced herein, the term "hosts" can refer to servers 106 (e.g., physical or logical), Hypervisors 108, VMs 110, containers 115 (e.g., Applications 117), EPGs 118, etc., and can run or include any type of server or application solution. Non-limiting examples of "hosts" can include virtual servers, bare metal physical hosts, VMs, Docker Containers, Virtual Routers/Switches (e.g., VPP), etc. Although containers 115 are illustrated as being instantiated on servers 106 it is understood that one or more of the VMs may be configured to host various containers. Additionally, applications 117, can include or maybe composed of software routines running in one or more of containers 115 and/or VMs 110.

Controllers 116 can provide centralized access to fabric information, application configuration, resource configuration, application-level policy modeling for a software-defined network (SDN) infrastructure, integration with management systems or servers, etc. Controllers 116 can form a control plane that interfaces with an application plane via northbound APIs and a data plane via southbound APIs. In some examples, controllers 116 can include SDN controllers or managers, such as an application policy infrastructure controller (APIC).

As previously noted, controllers 116 can define and manage application-level model(s) for policies in the network 100. Application or device policies can also be managed and/or defined by other components in the network. For example, a hypervisor or virtual appliance, such as a container, container cluster, and/or VM can run a server or management tool to manage software and services in network 100, including policies and settings for virtual appliances.

In one aspect of the disclosed technology, controllers 116 (e.g., one or more ACI APIC controller/s) can be used to facilitate the authentication of newly instantiated applications, such as containers in a cluster. That is, controllers 116 can be configured to receive an authentication decision resulting from an authentication process performed by a Virtual Network Edge (VNE) on behalf of a newly instantiated microservice (container), for example, as part of the 802.1X workflow.

Re-authentications for a particular microservice or set of microservices may also be requested after the 802.1X workflow is completed. Following subsequent authorizations, EAP messages can be forwarded to the microservice(s); if the re-authorization results in a state change for the service, the update can be propagated to the other VNEs, e.g., via the fabric controller. Additionally, it is possible to explicitly enable or disable specific sets of microservices. For example, in implementations where a microservice manager is used, such as Kubernetes, the enable/disable intent may be communicated using labels and enforced at the fabric controller. A more detailed explanation of the architecture used to perform distributed authentication is discussed with respect to FIG. 2.

Figure 2:
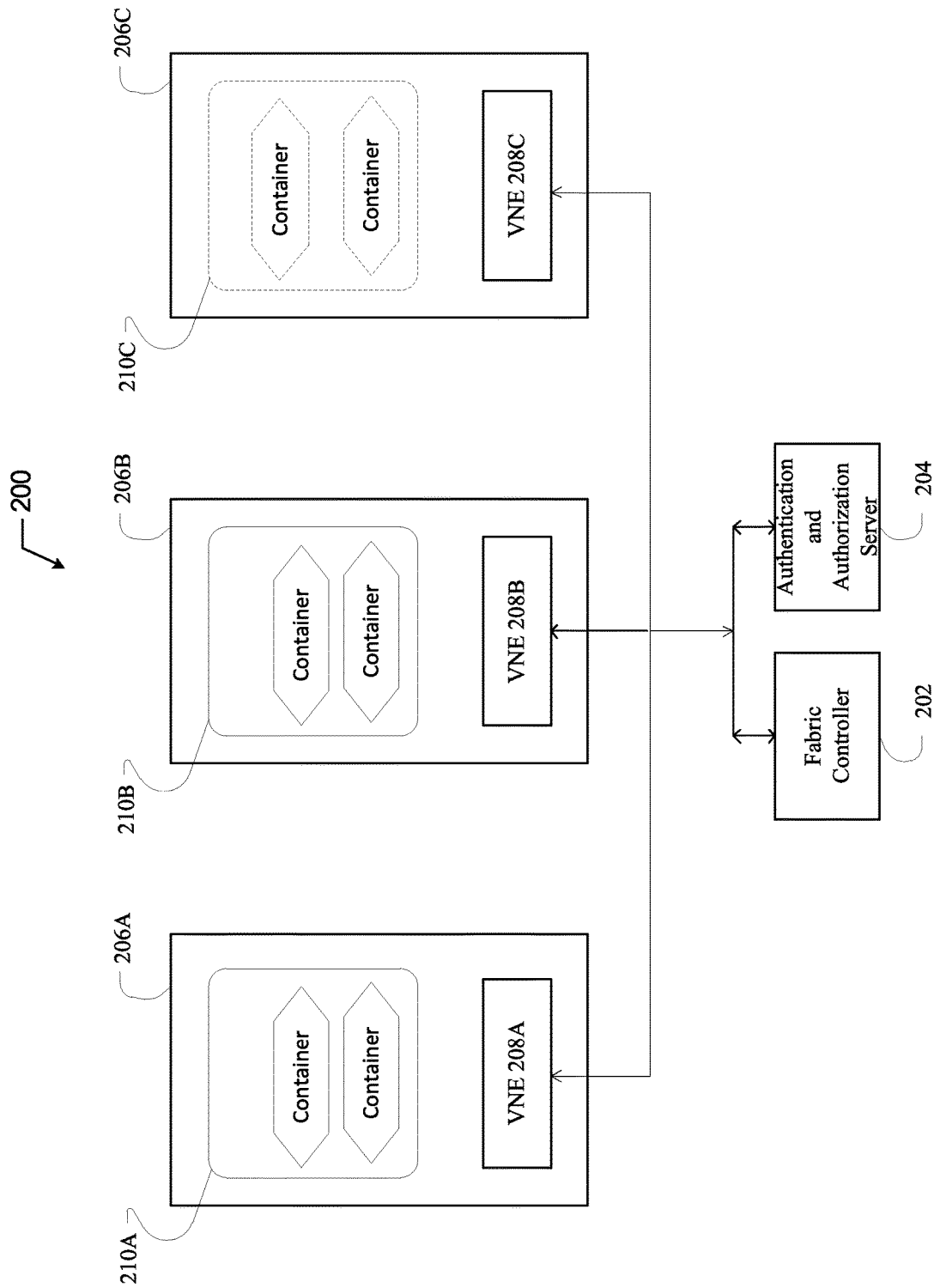
FIG. 2 conceptually illustrates an example network environment that includes a controller and authentication server configured to implement a distributed authentication process of the disclosed technology.

FIG. 2 conceptually illustrates an example network environment 200 that includes a controller and authentication server configured to implement a distributed authentication process of the disclosed technology. Environment 200 includes fabric controller 202, authentication server 204, and multiple hosts 206, e.g., 206A, 206B, and 206C. Each of hosts 206 includes a VNE 208, e.g., host 206A contains VNE 208A, host 206B contains VNE 208B, and hosts 206C contains VNE 208C. Additionally, each host 206 also includes a container pod 210, e.g., hosts 206A-C include pods 210A-C, respectively. As illustrated, each host 206 is coupled to fabric controller 202 via its corresponding VNE 208. In turn, each VNE 208 is also coupled to authentication server 204.

Newly deployed micro service pods are initially authenticated by authentication server 204 via a VNE associated with their corresponding host device. Subsequently, fabric controller 202 can distribute the resulting authentication state to each VNE 208. As such, subsequent microservices/microservice clusters/pods that are deployed on different hosts can be automatically authenticated by their local VNE, without the need to utilize authentication server 204.

In practice, controller 202 is configured to control each VNE 208, and to interact with a microservice deployment mechanism, such as Kubernetes, e.g., to register for new notification events. As such, controller 202 can register to be notified of new pod deployments, etc. Controller 202 also maintains a mapping of services to pods, which is distributed to each VNE.

By way of example, suppose that a new service associated with three replicas, such as pods 210A, 210B, and 210C, is newly configured by a microservice manager (e.g., Kubernetes). The first pod (210A) is deployed on host 206A. In this example, pod 210A seeks access to the network by gaining authorization from authentication server 204, via its corresponding VNE, e.g., VNE 208A. Authentication of pod 210A can follow the 802.1X workflow, for example, wherein authentication and authorization server 204 is implemented using a RADIUS or Cisco ISE configuration.

Upon completion of the authentication workflow, authentication server 204 provides an authentication state (e.g., either authorized or unauthorized), together with any authorization policies, such as, Access Control Lists, QoS etc.

VNE 208A reports the authentication state to controller 202 that, in turn, distributes the state to all other nodes (e.g., VNE instances). In the example of FIG. 2, fabric controller 202 distributes the authentication and authorization state received from VNE 208A to VNE 208B and VNE 208C on hosts 206B and 206C, respectively.

Subsequently, pod 210B, belonging to the same service as pod 210A, is deployed on host 206B. Upon deployment of pod 210 a local authenticator (e.g., VNE 208B) can either wait for pod 210B to initiate an authentication process (e.g., an 802.1X workflow), or it can proactively initiate the process. However, according to the distributed authentication process of the subject technology, VNE 208B can automatically authenticate pod 210B using the authentication state previously received from fabric controller 202. In such instances, the VNE (e.g., VNE 208B) can complete the 802.1X workflow by responding to the pod with an authentication result, such as "success" or "fail," to complete the authorization process.

It is understood that the ability of VNEs to perform an authentication depends on a service type of the newly instantiated microservice/pod. That is, a proactive (distributed) authentication by a local VNE can be performed only when the new pod/microservice is associated with a service that previously passed authentication using authentication server 204. By way of further example, if an additional pod (e.g., pod 210C) is deployed on server 206C belonging to a different service type than pods 210A, 210B, the local VNE (e.g., VNE 208C) cannot pass authentication based on the previously cached authentication result.

In some aspects, subsequent/additional authorizations for previously deployed containers, container clusters (pods), or particular services may be performed upon the occurrence of particular event. Further to the above example, re-authentication of pod 210A may be required by the pod or VNE 208A. In this example, the re-authorization is completed by VNE 208A, using the process discussed above, and EAP messages indicating authorization "success" or "fail" sates are forwarded to pod 210A. If the re-authorization results in a state change for the service, the update states can be propagated to the other VNEs, via fabric controller 202.

Additionally, in some implementations, it is possible to explicitly enable or disable specific sets of microservices. Further to the above example, re-authorizations for pod 210C may be disabled using labels that are provided to the microservices management system (Kubernetes). Authorization permissions can be additionally enforced by the fabric controller.

Figure 3:
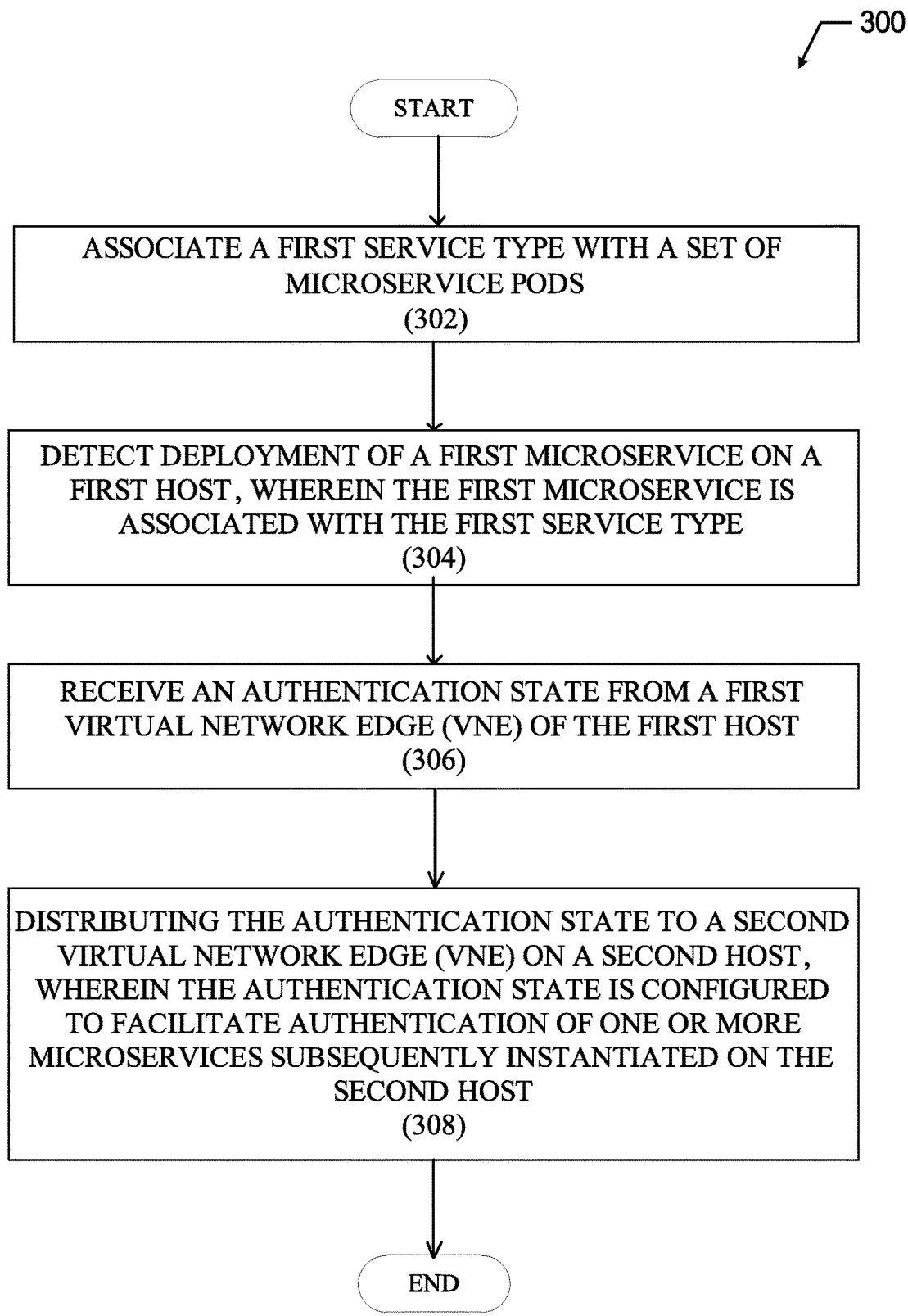
FIG. 3 illustrates steps of an example process 300 for implementing a distributed microservices authentication process of the disclosed technology.

FIG. 3 illustrates steps of an example process 300 for implementing a distributed micro service authentication protocol of the disclosed technology. Process 300 begins with step 302 in which a first service type is associated with a set of micro services, such as a set of micro service pods.

Although the micro services (or groups of micro services) can be administered and managed using any type of management platform, in some aspects, Kubernetes is used for micro service management. As such, a service type can be associated with one or more individual containers, and/or one or more container groups, e.g., pods or replicas, etc.

In step 304, deployment of a first micro service on a first host is detected, wherein the first micro service is associated with the first service type. As discussed above, a fabric controller (such as fabric controller 202) can be configured to interact with Kubernetes, and to register for notification events, such that notification is received upon new pod/ micro service deployments. As such, the fabric controller is made aware of the new pod deployment on the first host.

In step 306, the controller receives an authentication state, from first virtual network edge (VNE) of the first host. For example, as discussed above with respect to FIG. 2, an authentication server (such as authentication server 204) can be used to complete an 802.1X authentication workflow for the first microservice (pod) deployed on the first host, and to pass the authentication result to the fabric controller (e.g. fabric controller 202).

Subsequently, in step 308, the fabric controller distributes the authentication state to a second VNE on a second host, wherein the authentication state is configured to facilitate authentication of one or more micro services (pods) that are subsequently instantiated on the second host. Further to the example discussed above with respect to FIG. 2, authentication of subsequent micro services on the second host can be performed using the cached authentication result, for example, by a local VNE device present on the second host.

By caching and distributing authentication results across various devices, the authorization/authentication time of rapidly scaling microservices can be drastically improved e.g., by reducing the time for a pod to begin providing service. Because the disclosed technology also enables VNEs to perform pod authentication/authorization, pod authentication is distributed, thereby alleviating loads on the authentication server and adding authentication redundancy, for example, if authentication servers are taken offline.

As discussed above, re-authentications for a particular microservice or set of microservices may be requested by a POD or VNE. After subsequent authorizations are completed EAP messages can be forwarded to the microservice(s). If the re-authorization results in a state change for the service, the update can be propagated to the other VNEs, e.g., via the fabric controller. Additionally, in some implementations, it is possible to explicitly enable or disable specific sets of microservices. For example, in implementations where a microservice manager is used, such as Kubernetes, the enable/disable intent may be communicated using labels and enforced at the fabric controller.

Figure 4:
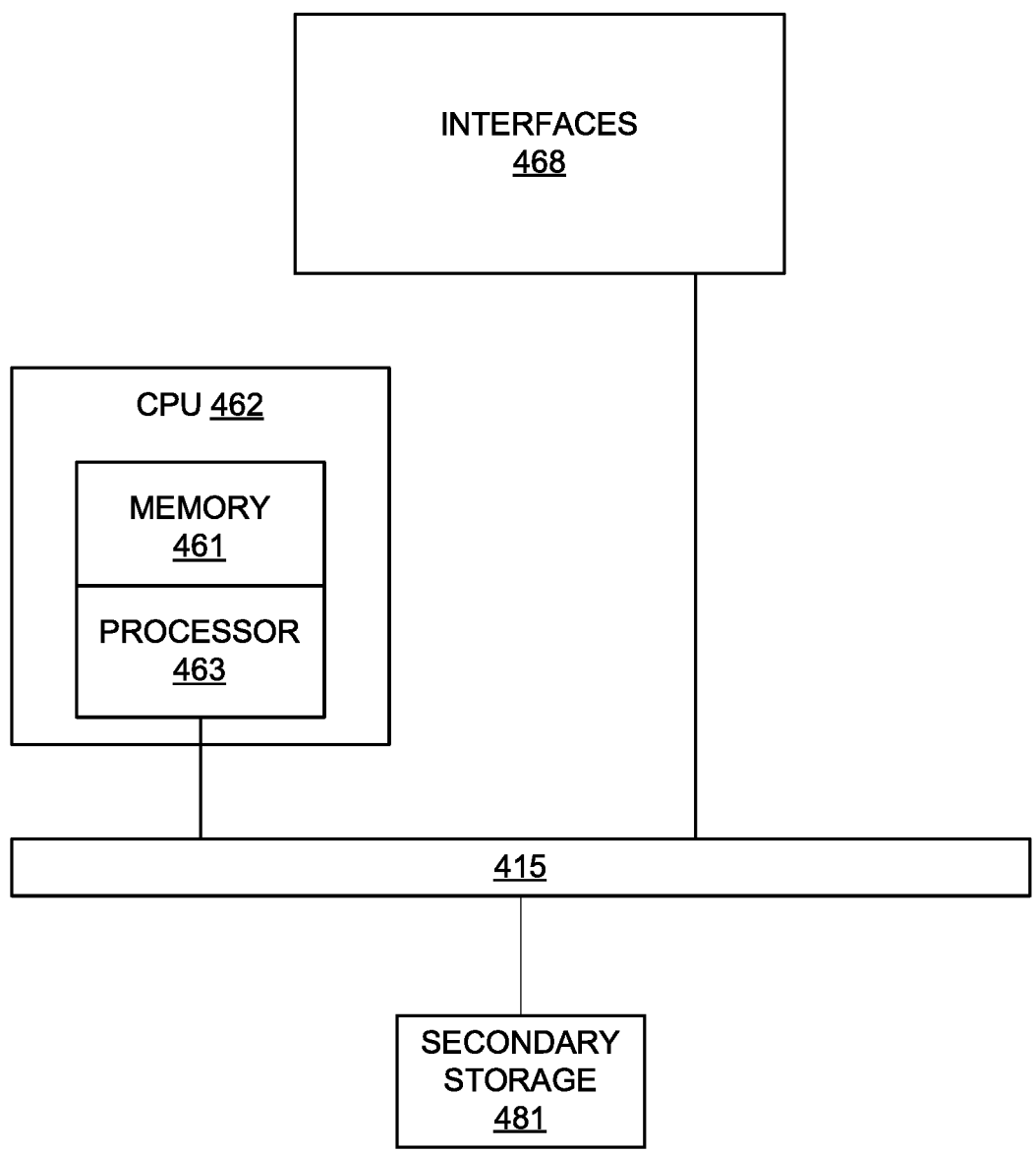
FIG. 4 illustrates an example network device in accordance with various embodiments.

FIG. 4 illustrates an example network device 400 suitable for implementing a process of the subject technology. Network device 400 includes a central processing unit (CPU) 404, interfaces 468, and a bus 415 (e.g., a PCI bus). When acting under the control of appropriate software or firmware, the CPU 462 is responsible for executing packet management, error detection, and/or routing functions. CPU 462 accomplishes all these functions under the control of software including an operating system and any appropriate applications software. CPU 462 may include one or more processors 408, such as a processor from the INTEL X86 family of microprocessors. In some cases, processor 463 can be specially designed hardware for controlling the operations of network device 400. In some cases, a memory 461, e.g., non-volatile Random Access Memory (RAM), Read Only Memory (ROM), etc., also forms part of CPU 462. However, there are many different ways in which memory could be coupled to the system.

Interfaces 468 can be provided as modular interface cards (sometimes referred to as "line cards"). They can control the sending and receiving of data packets over the network and sometimes support other peripherals used with network device 400. Among the interfaces that may be provided are Ethernet interfaces, frame relay interfaces, cable interfaces, Digital Subscriber Line (DSL) interfaces, token ring interfaces, and the like.

In addition, various very high-speed interfaces may be provided such as fast token ring interfaces, wireless interfaces, Ethernet interfaces, Gigabit Ethernet interfaces, ATM interfaces, High Speed Serial Interfaces (HSSIs), POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 404 to efficiently perform routing computations, network diagnostics, security functions, etc.

Although the system shown in FIG. 4 is one specific network device of the present embodiments, it is by no means the only network device architecture on which the present embodiments can be implemented. For example, an architecture having a single processor that handles communications as well as routing computations, etc., is often used. Further, other types of interfaces and media could also be used with the network device 400.

Regardless of the network device's configuration, it may employ one or more memories or memory modules (including memory 461, and secondary storage 481) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 461 could also hold various software containers and virtualized execution environments and data. Additionally, secondary storage 481 may be used as a distributed data store.

In some implementations, the program instructions may be configured to cause CPU 462 and/or processor 463 to perform operations for performing a distributed 802.1X authentication workflow. In particular, the program instructions can cause CPU 462 and/or processor 463 to perform operations for associating a first service type with a set of microservice pods, detecting deployment of a first microservice on a first host, wherein the first microservice is associated with the first service type, and receiving an authentication state from a first virtual network edge (VNE) of the first host. In some aspects, the process can further include steps for distributing the authentication state to a second virtual network edge (VNE) on a second host, wherein the authentication state is configured to facilitate authentication of one or more subsequent microservices instantiated on the second host.

In some implementations, the authentication state is configured to cause the second VNE to permit authentication if the one or more subsequent microservices are associated with the first service type. Additionally, in some aspects the authentication state is configured to cause the second VNE to deny authentication if the one or more subsequent microservices are not associated with the first service type, and/or wherein distributing the association between the first service type and the set of microservice pods to a plurality of VNE devices.

Network device 400 can also include an application-specific integrated circuit (ASIC), which can be configured to perform routing and/or switching operations. The ASIC can communicate with other components in the network device 400 via the bus 415, to exchange data and signals and coordinate various types of operations by the network device 400, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions.

Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A system for authenticating services, the system comprising:
   one or more processors;
   a memory storing instructions, which when executed by the one or more processors, causes the one or more processors to:
   associate a first service type with at least one service;
   detect a first service associated with the first service type on a first host;
   receive an authentication state from a first network edge of the first host; and
   distribute the authentication state to a second network edge of a second host, wherein the authentication state is configured to facilitate authentication of one or more services on the second host.

2. The system of claim 1, wherein the authentication state is configured to cause the second network edge to permit authentication when the one or more services on the second host are associated with the first service type.

3. The system of claim 1, wherein the authentication state is configured to cause the second network edge to perform authentication when the one or more services on the second host are not associated with the first service type.

4. The system of claim 1, wherein the at least one service is part of a service pod and the first service type is associated with the service pod.

5. The system of claim 1, wherein the authentication state is distributed to a plurality of network edges to facilitate authentication of the one or more services on a plurality of hosts.

6. The system of claim 1, further comprising instructions, which when executed by the one or more processors, causes the one or more processors to:
   reauthenticate the one or more services deployed before the authentication state was received.

7. The system of claim 1, wherein either the first network edge and second network edge, or both, are physical devices.

8. At least one non-transitory computer readable medium storing instructions, which when executed by one or more processors, causes the one or more processors to:
   associate a first service type with at least one service;
   detect a first service associated with the first service type on a first host;
   receive an authentication state from a first network edge of the first host; and
   distribute the authentication state to a second network edge of a second host, wherein the authentication state is configured to facilitate authentication of one or more services on the second host.

9. The at least one non-transitory computer readable medium of claim 8, wherein the authentication state is configured to cause the second network edge to permit authentication when the one or more services on the second host are associated with the first service type.

10. The at least one non-transitory computer readable medium of claim 8, wherein the authentication state is configured to cause the second network edge to perform authentication when the one or more services on the second host are not associated with the first service type.

11. The at least one non-transitory computer readable medium of claim 8, wherein the at least one service is part of a service pod and the first service type is associated with the service pod.

12. The at least one non-transitory computer readable medium of claim 8, wherein the authentication state is distributed to a plurality of network edges to facilitate authentication of the one or more services on a plurality of hosts.

13. The at least one non-transitory computer readable medium of claim 8, further comprising instructions, which when executed by the one or more processors, causes the one or more processors to:
   reauthenticate one or more services deployed before the authentication state was received.

14. The at least one non-transitory computer readable medium of claim 8, wherein either the first network edge and second network edge, or both, are physical devices.

15. A method comprising:
   associating a first service type with at least one service;
   detecting a first service associated with the first service type on a first host;
   receiving an authentication state from a first network edge of the first host; and
   distributing the authentication state to a second network edge of a second host, wherein the authentication state is configured to facilitate authentication of one or more services on the second host.

16. The method of claim 15, wherein the authentication state is configured to cause the second network edge to permit authentication when the one or more services on the second host are associated with the first service type.

17. The method of claim 15, wherein the authentication state is configured to cause the second network edge to perform authentication when the one or more services on the second host are not associated with the first service type.

18. The method of claim 15, wherein the at least one service is part of a service pod and the first service type is associated with the service pod.

19. The method of claim 15, further comprising reauthenticating the one or more services deployed before the authentication state was received.

20. The method of claim 15, wherein either the first network edge and second network edge, or both, are physical devices.

* * * * *